United States Patent
Liu et al.

(10) Patent No.: US 11,461,291 B2
(45) Date of Patent: Oct. 4, 2022

(54) METHOD, ELECTRONIC DEVICE AND COMPUTER PROGRAM PRODUCT FOR PROCESSING MACHINE LEARNING MODEL

(71) Applicant: EMC IP Holding Company LLC, Hopkinton, MA (US)

(72) Inventors: Jinpeng Liu, Shanghai (CN); Pengfei Wu, Shanghai (CN); Zhi Ying, Shanghai (CN); Min Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 16/678,758

(22) Filed: Nov. 8, 2019

(65) Prior Publication Data

US 2021/0034582 A1     Feb. 4, 2021

(30) Foreign Application Priority Data

Aug. 2, 2019 (CN) .......................... 201910712013.4

(51) Int. Cl.
   G06F 16/21        (2019.01)
   G06F 16/22        (2019.01)
   (Continued)

(52) U.S. Cl.
   CPC ........ G06F 16/212 (2019.01); G06F 16/2228 (2019.01); G06F 16/81 (2019.01); G06N 20/00 (2019.01)

(58) Field of Classification Search
CPC .... G06F 16/212; G06F 16/81; G06F 16/2228; G06N 20/00
See application file for complete search history.

(56) References Cited

U.S. PATENT DOCUMENTS

| | | | |
|---|---|---|---|
| 10,643,144 B2 * | 5/2020 | Bowers | G06N 20/00 |
| 2014/0118355 A1 * | 5/2014 | Vassilvitskii | G06T 11/206 |
| | | | 345/440 |

(Continued)

OTHER PUBLICATIONS

L. Song et al., "HyPar: Towards Hybrid Parallelism for Deep Learning Accelerator Array," arXiv:1901.02067v1, Jan. 7, 2019, 13 pages.

(Continued)

*Primary Examiner* — Phillip H Nguyen
(74) *Attorney, Agent, or Firm* — Ryan, Mason & Lewis, LLP

(57) ABSTRACT

A method comprises obtaining an intermediate representation of the machine learning model written in a source language. The intermediate representation is independent of the source language and a target language and comprises a structured text. The method also comprises generating a computation graph based on the intermediate representation. Nodes in the computation graph represent functions related to the machine learning model and a directed edge in the computation graph represents a dependency between functions. The method further comprises partitioning the computation graph into sequential parts in sequence such that the parts are executed sequentially, and functions corresponding to nodes in each part are executed in parallel.

20 Claims, 5 Drawing Sheets

(51) Int. Cl.
*G06F 16/81* (2019.01)
*G06N 20/00* (2019.01)

(56) References Cited

U.S. PATENT DOCUMENTS

| | | | |
|---|---|---|---|
| 2018/0136912 A1* | 5/2018 | Venkataramani | G06N 3/0454 |
| 2019/0286657 A1* | 9/2019 | Li | G06F 16/90328 |
| 2020/0257992 A1* | 8/2020 | Achin | G06N 5/04 |
| 2020/0327371 A1* | 10/2020 | Sharma | G06K 9/6257 |
| 2020/0401930 A1* | 12/2020 | Smirnov | G06N 5/022 |

OTHER PUBLICATIONS

U.S. Appl. No. 16/542,757 filed in the name of Jinpeng Liu et al. on Aug. 16, 2019 and entitled "Method, Device and Computer Program Product for Processing Machine Learning Model."

* cited by examiner

METHOD, ELECTRONIC DEVICE AND COMPUTER PROGRAM PRODUCT FOR PROCESSING MACHINE LEARNING MODEL

RELATED APPLICATION(S)

The present application claims priority to Chinese Patent Application No. 201910712013.4, filed Aug. 2, 2019, and entitled "Method, Electronic Device and Computer Program Product for Processing Machine Learning Model," which is incorporated by reference herein in its entirety.

FIELD

Embodiments of the present disclosure generally relate to the field of artificial intelligence, and more specifically, to a method, an electronic device and a computer program product for processing a machine learning model.

BACKGROUND

In recent years, with the progress of artificial intelligence technology, machine learning or deep learning (DL) has promoted developments in many fields. Meanwhile, machine learning models are becoming more complicated and need an increasingly growing data set, thus execution of such machine learning models needs more computing resources. Currently, due to the restrictions of the computing capability of central processing units (CPUs) and the communication bandwidth of peripheral computing devices, the computing capability of a single machine can hardly satisfy demands of a large-scale machine learning model. Therefore, how to deploy a machine learning model efficiently has become the focus of current concern.

SUMMARY

Embodiments of the present disclosure provide a method, an electronic device, and a computer program product for processing a machine learning model.

In accordance with a first aspect of the present disclosure, there is provided a method for processing a machine learning model. The method comprises obtaining an intermediate representation of the machine learning model written in a source language. The intermediate representation is independent of the source language and a target language and comprises a structured text. The method also comprises generating a computation graph based on the intermediate representation. Nodes represent functions related to the machine learning model and a directed edge represents a dependency between functions. The method further comprises partitioning the computation graph into sequential parts, such that the plurality of parts are executed sequentially, and functions corresponding to nodes in each part are executed in parallel.

In a second aspect of the present disclosure, there is provided an electronic device. The electronic device comprises: a processor; and a memory storing computer program instructions, the processor running the computer program instructions in the memory to control the electronic device to perform acts of: obtaining an intermediate representation of the machine learning model written in a source language, the intermediate representation being independent of the source language and a target language and comprising a structured text; generating a computation graph based on the intermediate representation, nodes in the computation graph representing functions related to the machine learning model, a directed edge in the computation graph representing a dependency between functions; and partitioning the computation graph into sequential parts, such that the plurality of parts are executed sequentially, and functions corresponding to nodes in each part are executed in parallel.

In accordance with a third aspect of the present disclosure, there is provided a computer program product. The computer program product is tangibly stored on a non-volatile computer-readable medium, and comprises machine-executable instructions. The machine-executable instructions, when executed, cause a machine to perform steps of the method in the first aspect of the present disclosure.

Advantageously, through the above method, there is no need to take inter-layer and intra-layer communication of a deep learning model into consideration during processing of a machine learning model and also there is no need to divide tensor data. Moreover, the processing method is more efficient in respect to time and space.

BRIEF DESCRIPTION OF THE DRAWINGS

The above and other objectives, features and advantages of the present disclosure will become more apparent, through the following detailed description of the example embodiments of the present disclosure with reference to the accompanying drawings.

Throughout the drawings, the same or similar symbols refer to the same or similar elements.

DETAILED DESCRIPTION

Figure 1:
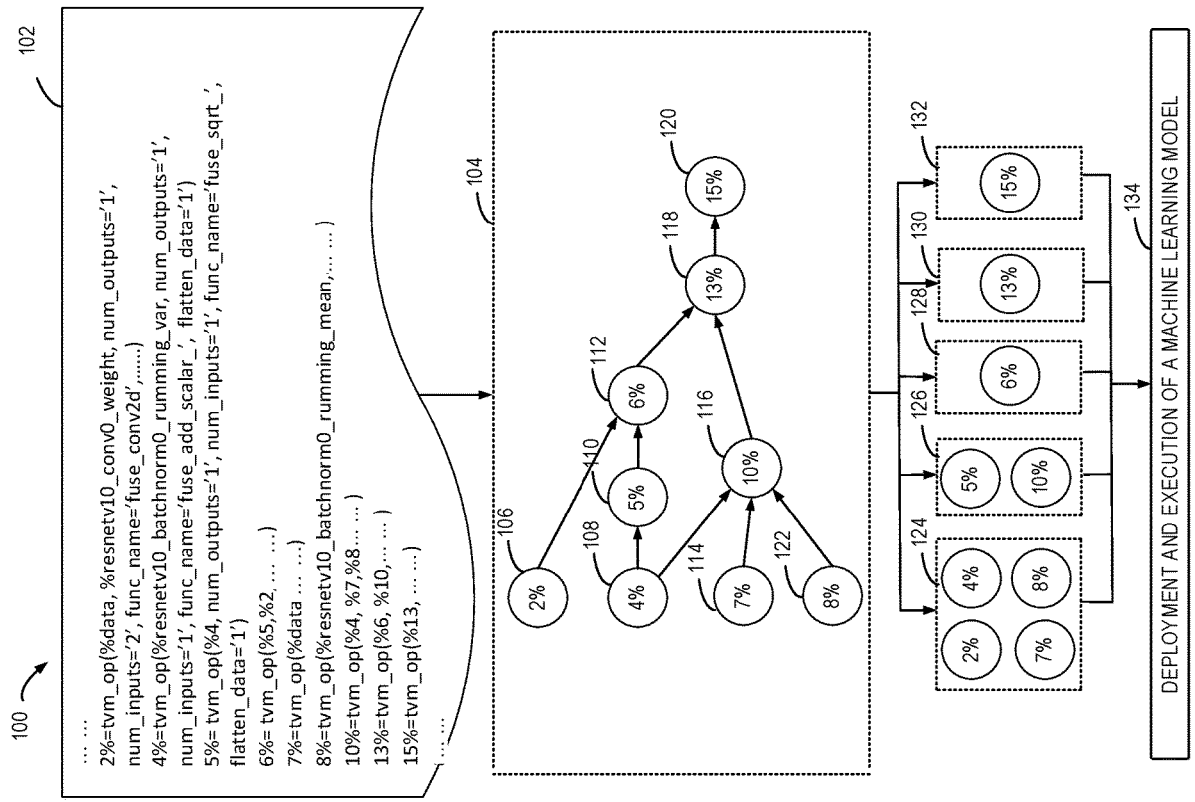
FIG. 1 illustrates a schematic diagram of an example environment in which a device and/or method according to embodiments of the present disclosure can be implemented.

Embodiments of the present disclosure will now be described in detail with reference to the accompanying drawings. Although the drawings illustrate some embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely. It would be appreciated that the drawings and embodiments are provided merely for illustration, without any intention of limiting the protection scope of the present disclosure.

As described herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

Principles of the present disclosure will be described below with reference to several example embodiments as shown in the accompanying drawings. Although the drawings illustrate preferred embodiments of the present disclosure, it would be appreciated that these embodiments are provided to help those skilled in the art better understand and further carry out the present disclosure, rather than suggesting any limitation.

When a machine learning model is utilized to process data, data are processed in parallel at the initial stage. In this way, every machine runs the machine learning model thereon, to process a respective part of data. However, the development of machine learning models has resulted in a single device being unable to run the whole machine learning model independently. Thus, model parallelism is employed to run the large, complicated machine learning model.

Program developers usually adopt a specified framework to write a machine learning model and define a neural network layer by layer. Hence, when model parallelism is used to process a machine learning model, different layers in the machine learning model are usually distributed to different computing devices. However, when a framework or a compiler is compiling a machine learning model program, a single binary program is often generated. At this point, the generated program has less information about how to organize the layers. Therefore, the framework and the developers can hardly split the entire computing task from the single binary program into different computing nodes layer by layer.

In addition, different parameter formats are employed in different neural networks. For example, parameter formats in a convolution neural network (CNN) and a recursive neural network (RNN) are different. Even in the same type of neural networks (for example, CNN), different partitioning solutions may also bring about different parameter formats since the numbers of layers and nodes in the layers are different. Consequently, it is difficult to implement model parallelism for a machine learning model.

In order to solve at least one of the above problems, the present disclosure provides a method for processing a machine learning model. In the method, an intermediate representation of a machine learning model written in a source language is obtained. Then, a computation graph is generated based on the intermediate representation. A manager partitions the computation graph into a plurality of parts in sequence according to in-degrees of nodes, such that the plurality of parts are executed sequentially, and functions in each part are executed in parallel. Through the above method, processing a machine learning model is implemented at a function level, rather than at an instruction level. Therefore, the processing of a machine learning model is more efficient and feasible. In addition, the method does not require inter-layer and intra-layer communication of a deep learning model, and does not need to divide a parameter tensor, an error tensor, and the like. In addition, this automatic partitioning method of this present application is more efficient in respect to time and space. Further, as partitioning can be implemented prior to running a machine learning model, training time can be saved thereby.

Hereinafter, FIG. 1 illustrates a schematic diagram of an example environment 100 in which a device and/or a method according to embodiments of the present disclosure can be implemented.

As shown in FIG. 1, in the example environment 100, an intermediate representation 102 of a machine learning model is obtained from the machine learning model written in a source language. In some embodiments, a machine learning model compiled in a source language may be written in different source languages, for example, CUDA, Java, Python, C++, Fortran, Ada, C#, and the like. In some embodiments, a machine learning model written in a source language may be determined by different frameworks. The above example is provided merely for describing the present disclosure, rather than suggesting any specific limitation to the present disclosure.

In some embodiments, the intermediate representation 102 of the machine learning model may be obtained by a compiler through compiling the machine learning model written in a source language. Compiling refers to a procedure of transforming a source code/original code written in a source language into a machine code or local code of target architecture. The intermediate representation 102 is a data structure or code for representing source code used within a compiler or virtual machine and the intermediate representation 102 is not related to the source language and the target language. In some embodiments, the intermediate representation 102 of the machine learning model may be obtained in other manners, for example, that a programmer writes a machine learning model written in a source language into an intermediate representation 102 of the machine learning model according to compiling rules of a compiler. The above example is provided merely for illustration, rather than suggesting any specific limitation to the present disclosure. The intermediate representation 102 of the machine learning model written in a source language may be obtained in any appropriate manner.

In some embodiments, the intermediate representation 102 of the machine learning model may be described in a structured text. For example, the intermediate representation 102 may include an intermediate representation of a machine learning model described in the format of JavaScript Object Notation (JSON) or Extensible Markup Language (XML). The intermediate representation 102 of the machine learning model as shown in FIG. 1 is provided merely for illustration, rather than suggesting any specific limitation to the present disclosure. Those skilled in the art may describe an intermediate representation of a machine learning model in any appropriate language, as required.

The intermediate representation 102 of the machine learning model is conveyed to a manager. The manager is provided for processing the received intermediate representation 102 of the machine learning model, to partition the machine learning model. The manager may be implemented in software or hardware.

The manager may generate a computation graph 104 based on the intermediate representation 102 of the machine learning model. Node(s) in the computation graph 104 represent a function(s) in the machine learning model. The computation graph 104 also comprises dependencies between functions. For example, a directed edge in the computation graph 104 represents that an input of a function corresponding to the end point of the directed edge is dependent on an output of a function corresponding to the starting point of the directed edge. Alternatively or in addition, the computation graph 104 is a directed acyclic graph.

As shown in FIG. 1, the computation graph 104 obtained from the intermediate representation 102 of the machine learning model includes: a node 106, a node 108, a node 110, a node 112, a node 114, a node 116, a node 118, a node 120 and a node 122. Each node in the computation graph 104 represents a function in the machine learning model, and a connection line between nodes represents a dependency between functions. For example, the output of the node 106 is transmitted to the node 112 and the output of the node 110 is transmitted to the node 112. Therefore, the node 112 is dependent on both the node 106 and the node 110. The computation graph 104 in FIG. 1 is provided merely as an example for describing a computation graph. The number of nodes in a computation graph and the structure of the computation graph may be designed in any appropriate form, based on an intermediate representation 102 of a machine learning model.

The manager may partition the computation graph 104 generated from the intermediate representation 102 of the machine learning model into a plurality of parts in sequence, including: a first part 124, a second part 126, a third part 128, a fourth part 130, and a fifth part 132. In some embodiments, the manager partitions the computation graph 104, based on in-degrees of nodes. An in-degree of a node represents a number of directed edges directed to the node.

Subsequently, the manager may apply the first part 124, the second part 126, the third part 128, the fourth part 130, and the fifth part 132 obtained to deployment and execution 134 of the machine learning model. The respective parts are executed sequentially during execution, and functions in respective parts may be executed in parallel.

Figure 2:
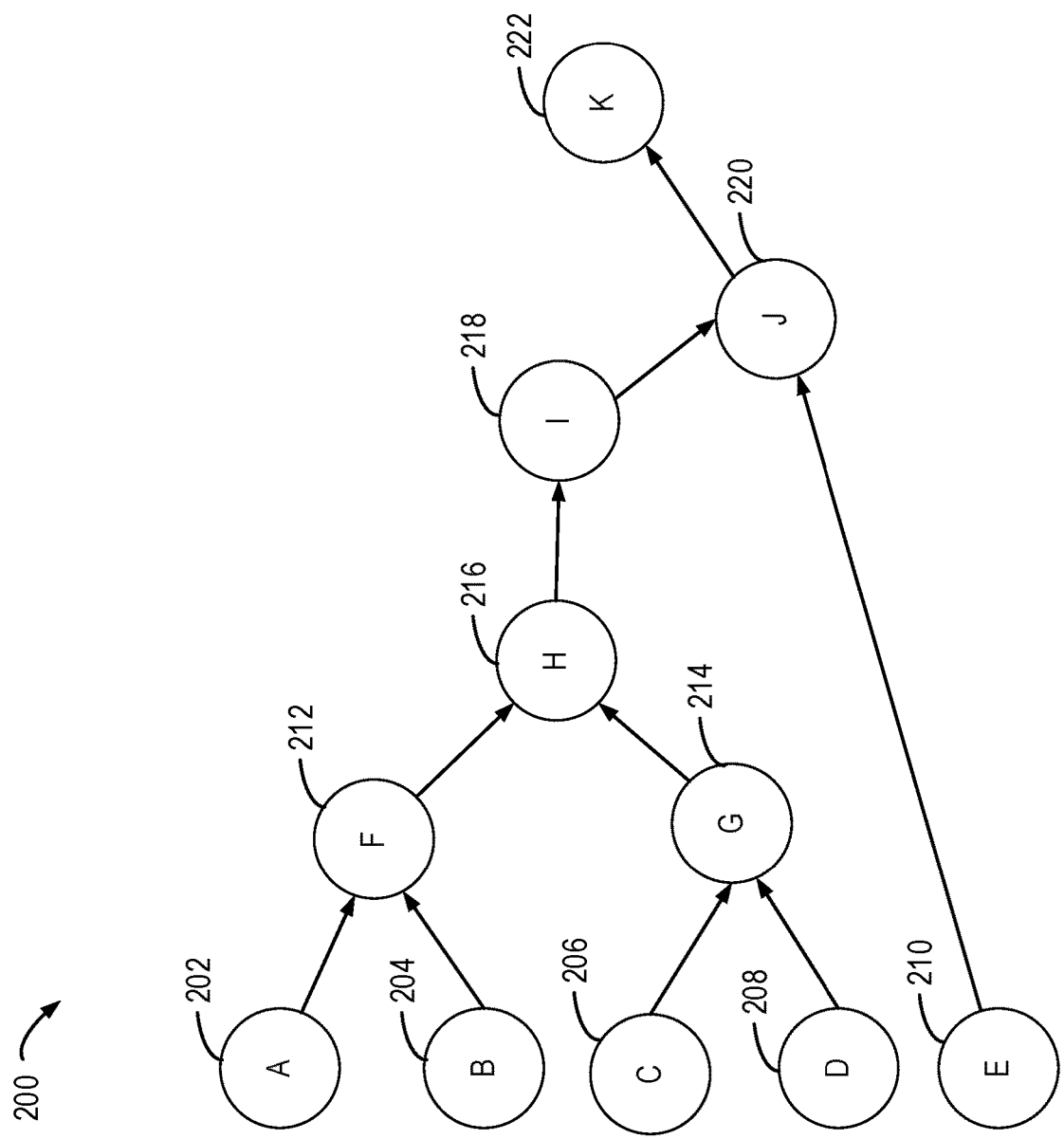
FIG. 2 illustrates a computation graph according to embodiments of the present disclosure.

The example environment 100 in which a device and/or method according to embodiments of the present disclosure can be implemented has been described above with reference to FIG. 1. FIG. 2 illustrates a schematic diagram of a computation graph 200 according to embodiments of the present disclosure.

For example, FIG. 2 shows a computation graph 200 that is obtained based on an intermediate representation of a machine learning model and including eleven nodes: a node A 202, a node B 204, a node C 206, a node D 208, a node E 210, a node F 212, a node G 214, a node H 216, a node I 218, a node J 220, and a node K 222. Each node in the computation graph represents a function in the machine learning model, and each connection line between nodes represents a dependency between functions. For example, the output of the node A 202 is transmitted to the node F 212, the output of the node B 204 is also transmitted to the node F 212. Therefore, the node F 212 is dependent on both the node A 202 and the node B 204. FIG. 2 is provided merely as an example for describing a computation graph. The number of nodes in a computation graph and the structure of the computation graph may be designed in any appropriate form, as required.

In the computation graph 200, since there is no directed edge directed to the node A 202, the node B 204, the node C 206, the node D 208, and the node E 210, the in-degrees of the node A 202, the node B 204, the node C 206, the node D 208, and the node E 210 are equal to 0. Since there are two directed edges directed to the node F 212 and the node G 214, respectively, the in-degrees of the node F 212 and the node G 214 are equal to 2. Likewise, the in-degree of the node H 216 is equal to 2, the in-degree of the node I 218 is equal to 1, the in-degree of the node J 220 is equal to 2, and the in-degree of the node K 222 is equal to 1.

Figure 3:
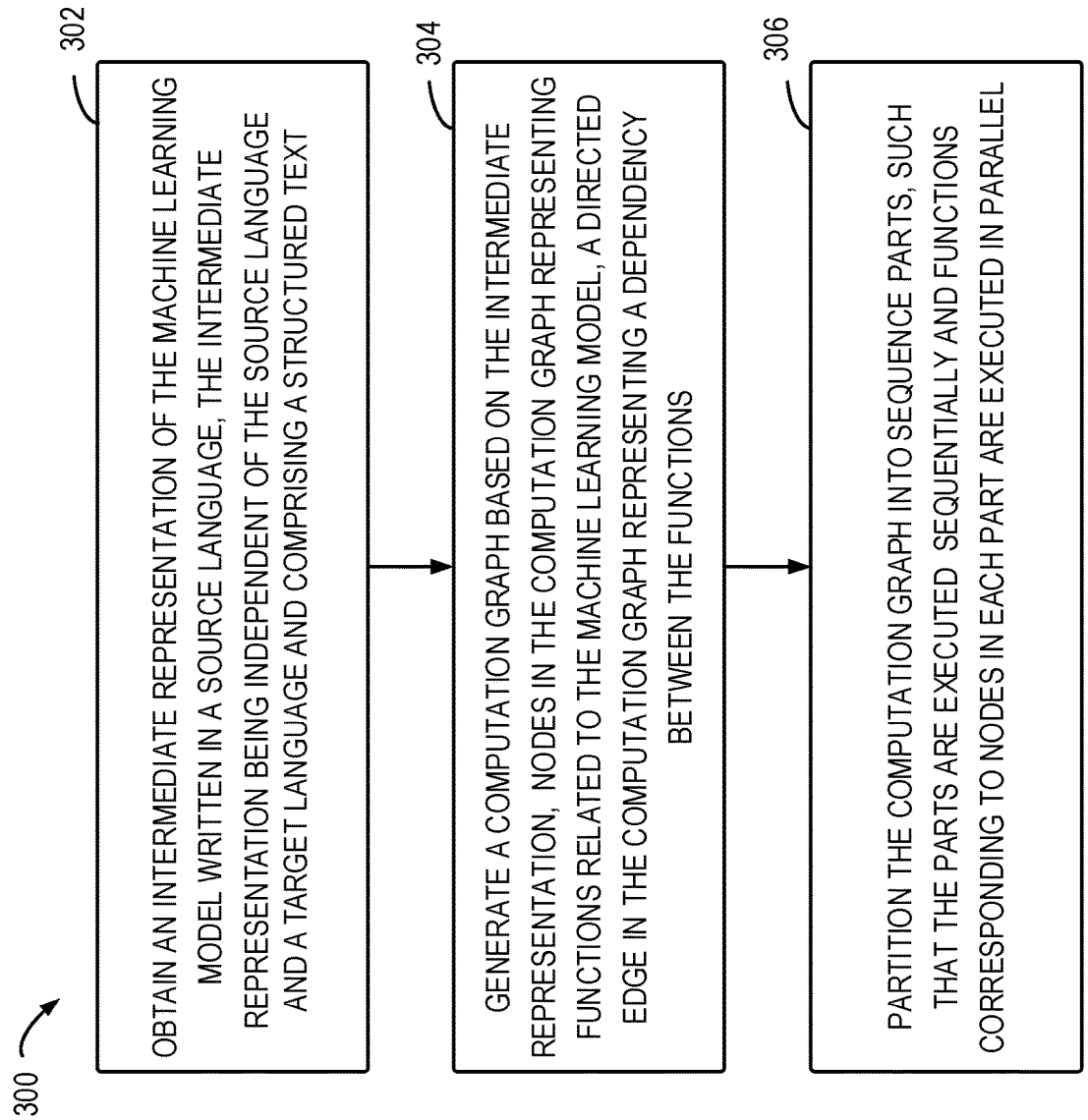
FIG. 3 illustrates a flowchart of a method for processing a machine learning model according to embodiments of the present disclosure.

FIG. 2 illustrating the schematic diagram of the computation graph 200 according to the embodiments of the present disclosure has been discussed above. The method 300 for processing a machine learning model as shown in FIG. 3 will be described with reference to FIG. 2.

At block 302, a manager obtains an intermediate representation of a machine learning model written in a source language, wherein the intermediate representation of the machine learning model is independent (i.e., irrelevant to, agnostic with respect to, etc.) of the source language and the target language and includes a structured text.

In some embodiments, the intermediate representation of the machine learning model may be obtained by a compiler through compiling the machine learning model written in a source language. Compiling refers to a procedure of transforming a source code/original code written in a source language into a machine code or local code of target architecture. The intermediate representation 102 is a data structure or code for representing source code used within a compiler or virtual machine, and the intermediate representation 102 is independent of the source language and the target language.

In some embodiments, the intermediate representation of the machine learning model may be obtained in other manners, for example, that a programmer writes a machine learning model written in a source language into an intermediate representation of the machine learning model according to compiling rules of a compiler. The above example is provided merely for describing the present disclosure, rather than suggesting any specific limitation to the present disclosure. The intermediate representation of the machine learning model written in a source language may be obtained in any appropriate manner.

In some embodiments, the intermediate representation of the machine learning model may be described in a structured text. For example, the intermediate representation 102 may include an intermediate representation of a machine learning model described in the format of JavaScript Object Notation (JSON) or Extensible Markup Language (XML).

At block 304, the manager generates a computation graph based on the intermediate representation of the machine learning model. In the computation graph, a node represents a function related to the machine learning model, and a directed edge represents a dependency between the functions.

The intermediate representation of the machine learning model includes dependencies between inputs and outputs of the functions. The manager may generate the computation graph based on the dependencies between functions.

In some embodiments, a node in the computation graph represents a function in a machine learning model. A directed edge in the computation graph represents that an input of a function corresponding to the end point of the directed edge is dependent on an output of a function corresponding to a starting point of the directed edge. Alternatively or in addition, the computation graph is a directed acyclic graph.

Figure 4:
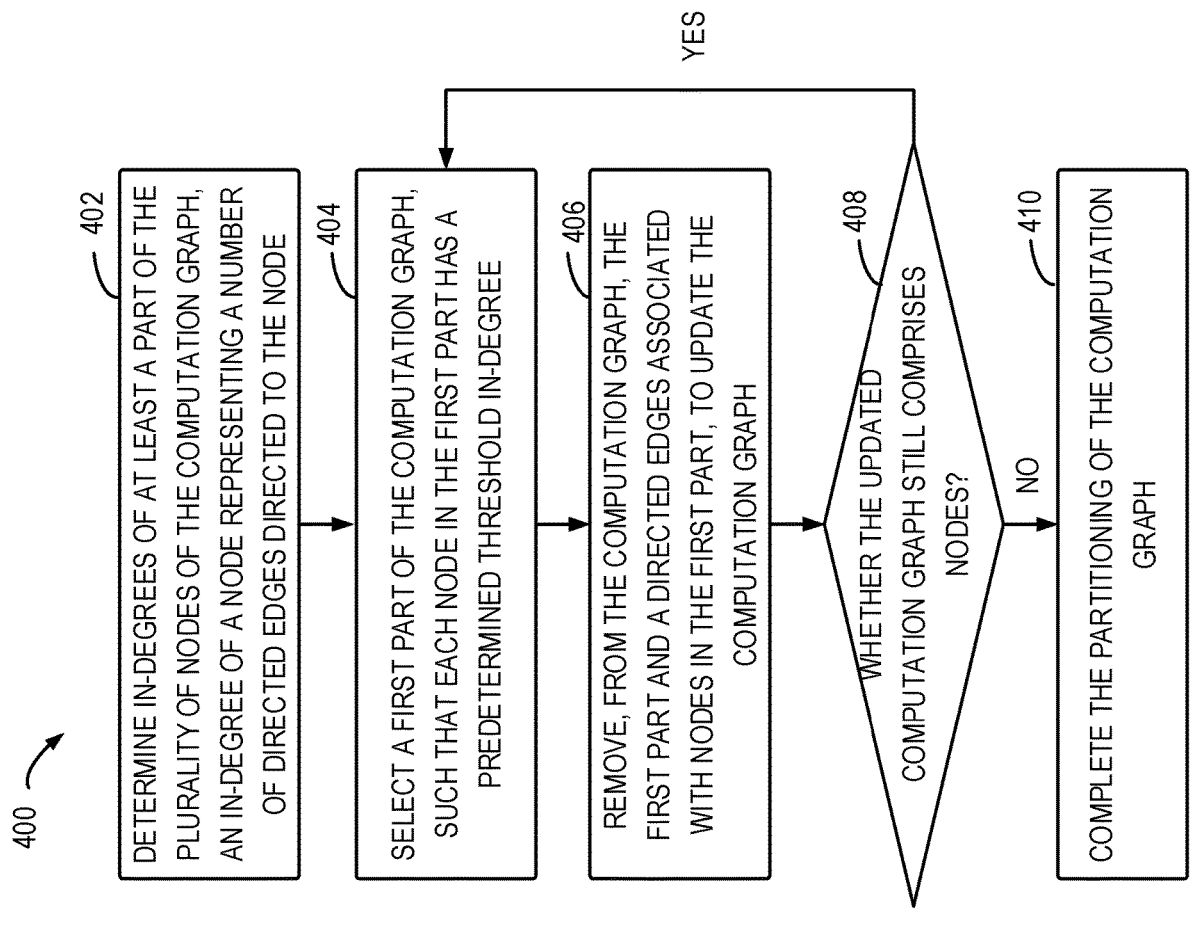
FIG. 4 illustrates a flowchart of a method of partitioning a computation graph into a plurality of parts according to embodiments of the present disclosure.

At block 306, the manager partitions the computation graph into sequential parts such that the parts are executed sequentially and the functions corresponding to the nodes in each part are executed in parallel. The manager partitions the generated computation graph into a plurality of sets of functions required to be executed sequentially. The functions in each set are independent of each other and can be executed in parallel. The process of partitioning a computation graph into a plurality of parts will be described below in detail with reference to FIG. 4.

As shown in FIG. 2, the computation graph 200 may be partitioned into a plurality of parts. The first part includes the node A 202, the node B 204, the node C 206, the node D 208, and the node E 210; the second part includes the node F 212, the node G 214; the third part includes the node H 216; the fourth part includes the node I 218; the fifth part includes the node J 220; and the sixth part includes the node K 222. It is required to execute the above plurality of parts sequentially, because the inputs of the functions in the following part are dependent on the outputs of the functions in the preceding part, while the functions in each part can be executed in parallel.

Through the above method, the procedure of processing a machine learning model is performed at a function level, rather than at an instruction level. Therefore, processing of a machine learning model is more efficient and feasible. In addition, and the method does not require inter-layer and intra-layer communication of a deep learning model, and does not need to divide a parameter tensor, an error tensor, and the like. In addition, this automatic partitioning method of this present application is more efficient in respect to time and space. Further, as partitioning can be implemented prior to running a machine learning model, training time can be saved thereby.

The flowchart of the method 300 of processing a machine learning model according to embodiments of the present disclosure has been described above with reference to FIG. 3. Hereinafter, the process of partitioning a computation graph at block 306 in FIG. 3 will be described in detail with reference to FIG. 4 which illustrates a method 400 of partitioning a computation graph into a plurality of parts.

At block 402, the manager determines in-degrees of at least a part of the plurality of nodes in the computation graph. An in-degree of a node represents a number of directed edges directed to the node. In a computation graph, each node may have some directed edges, for example, directed edges with starting points at the node or end points at the node. In order to partition nodes, in-degrees of nodes are employed, for partitioning the computation graph. That is, the nodes are partitioned by determining the number of directed edges with end points at the node. In some embodiments, the computation graph is a directed acyclic graph.

As shown in example of FIG. 2, in the computation graph 200, since there is no directed edge directed to the node A 202, the node B 204, the node C 206, the node D 208, and the node E 210, the respective in-degrees thereof are equal to 0. Since there are two directed edges directed to the node F 212 and the node G 214, respectively, the in-degrees of the node F 212 and the node G 214 are equal to 2. Likewise, the in-degree of the node H 216 is equal to 2, the in-degree of the node I 218 is equal to 1, the in-degree of the node J 220 is equal to 2, and the in-degree of the node K 222 is equal to 1.

At block 404, the manager selects the first part of the computation graph. Each node in the first part has a predetermined threshold in-degree. In some embodiments, the threshold in-degree is equal to zero. After the manager has determined the in-degree for each node in the computation graph, nodes with the threshold in-degree may be selected from all nodes as the first part of the computation graph.

As shown in FIG. 2, the nodes with the threshold in-degree of 0 are selected from the computation graph as the first part. Consequently, the node A 202, the node B 204, the node C 206, the node D 208, and the node E 210 are selected as the first part.

At block 406, the manager removes, from the computation graph, the first part and a directed edges associated with the nodes in the first part, to update the computation graph. After selecting the first part of nodes, in order to select other sequential parts, the manager removes the nodes in the first part and the directed edges related to those nodes from the computation graph to form an updated computation graph and the manager then updates the in-degrees of the nodes.

As shown in FIG. 2, upon partitioning the computation graph, the manager selects the nodes with the in-degree of 0 as the first set. Then, the nodes with the in-degree of 0 (i.e., the node A 202, the node B 204, the node C 206, the node D 208, and the node E 210) are removed. The manager further removes the directed edges related to the nodes from the first graph, to form an updated computation graph. In addition, the manager adjusts the in-degrees of nodes in the updated computation graph.

At block 408, the manager determines whether the updated computation graph still includes nodes. In case that the updated computation graph does not include nodes, the manager determines that the partitioning for the computation graph is completed at block 410.

In case that the updated computation graph still includes nodes, the operation returns to block 404, to further take the updated computation graph as a computation graph to be processed. Then, the manager selects the nodes having an in-degree of 0 (such as the node F 212 and the node G 214 in FIG. 2) from the updated computation graph as the second set based on the in-degrees of the nodes. Then, iteration processing is performed in the above manner until all nodes are divided.

Finally, the computation graph 200 may be partitioned into a plurality of parts: the first part includes the node A 202, the node B 204, the node C 206, the node D 208, and the node E 210; the second part includes the node F 212 and the node G 214; the third part includes the node H 216; the fourth part includes the node I 218; the fifth part includes the node J 220; and the sixth part includes the node K 222. Since the inputs of the functions in the following part are dependent on the outputs of the functions in the preceding part, it is required to execute the respective parts sequentially. However, the nodes in each part do not have a dependency relation and thus can be executed in parallel.

Through the above method, a machine learning model is partitioned at a function level during processing, such that the machine learning model can be more efficient and feasible. Moreover, the method has a low partition complexity in respect to time, and is more efficient in respect to space since it does not requires too much auxiliary data.

Figure 5:
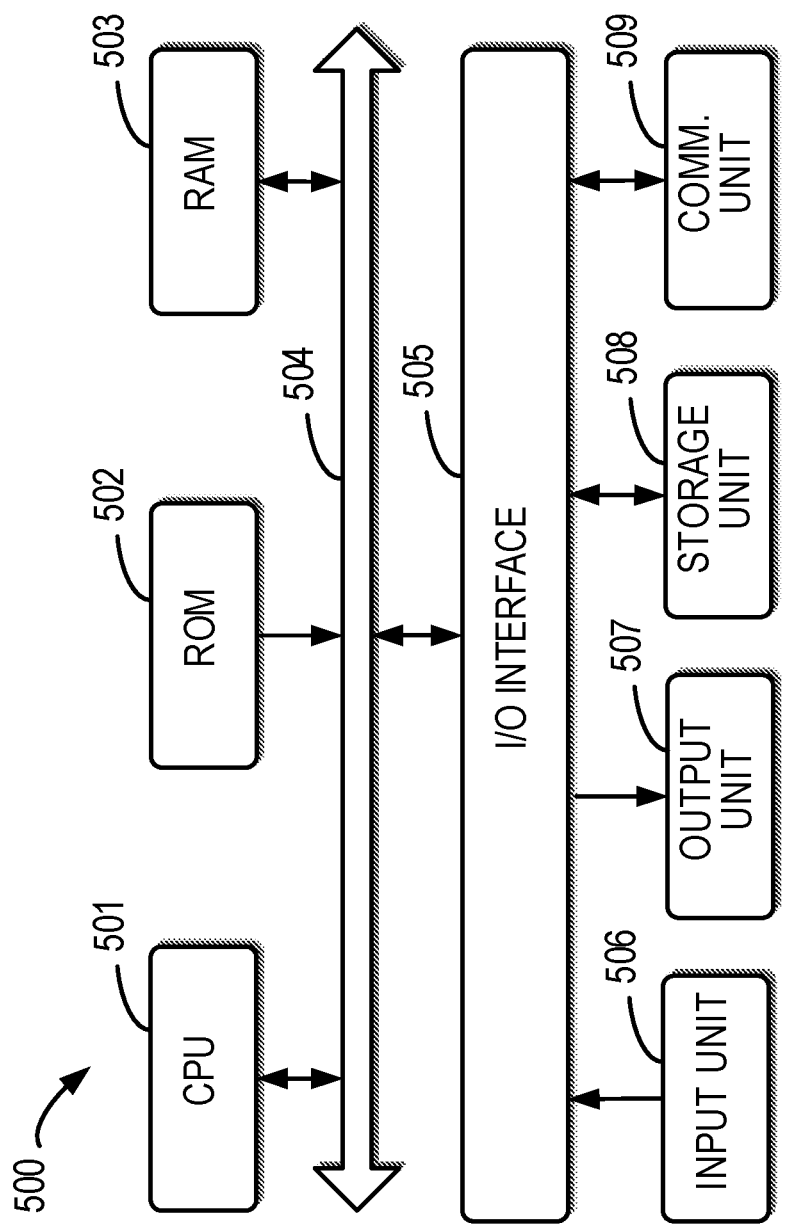
FIG. 5 illustrates a schematic diagram of an example device adapted to implement embodiments of the present disclosure.

FIG. 5 illustrates a block diagram of an example device 500 that can be used to implement embodiments of the present disclosure. For example, the manager used in FIG. 1 may be implemented by the device 500. As shown, the device 500 includes a central processing unit (CPU) 501 which performs various appropriate acts and processing, based on a computer program instruction stored in a read-only memory (ROM) 502 or a computer program instruction loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505, comprising: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 300 and 400 may be executed by the processing unit 501. For example, in some embodiments, the methods 300 and 400 may be implemented as a computer software program that is tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the methods 300 and 400 as described above may be executed.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a machine learning model, comprising:
    obtaining an intermediate representation of a machine learning model written in a source language, the intermediate representation being independent of the source language and a target language and comprising a structured text;
    generating a computation graph based on the intermediate representation, nodes in the computation graph representing functions related to the machine learning model, a directed edge in the computation graph representing a dependency between the functions; and
    partitioning the computation graph into sequential parts, such that the parts are executed sequentially and functions corresponding to nodes in each part are executed in parallel;
    wherein partitioning the computation graph into sequential parts comprises determining a value for each of at least a first part of the nodes of the computation graph, wherein the value represents a number of edges directed to a given node; and
    wherein each node in the first part has a first predetermined value.

2. The method of claim 1, wherein partitioning the computation graph into sequential parts comprises partitioning the computation graph into the parts based on the values for each of the at least a first part of the nodes.

3. The method of claim 2, wherein partitioning the computation graph into sequential parts based on the values comprises executing iteratively acts of removing, from the computation graph, the first part and a directed edge associated with nodes in the first part, to update the computation graph.

4. The method of claim 3, wherein partitioning the computation graph into sequential parts based on the values comprises executing iteratively acts of selecting one or more sequential first parts of the computation graph, such that each node in the one or more sequential first parts has the first predetermined value.

5. The method of claim 4, wherein the first predetermined value is equal to zero.

6. A computer program product, being tangibly stored on a non-transitory computer-readable medium and comprising machine executable instructions, the machine executable instructions, when executed, causing a machine to perform acts comprising:
    obtaining an intermediate representation of a machine learning model written in a source language, the intermediate representation being independent of the source language and s target language and including a structured text;
    generating a computation graph based on the intermediate representation, a node in the computation graph representing functions related to the machine learning model, a directed edge in the computation graph representing a dependency between the functions; and
    partitioning the computation graph into sequential parts, such that the parts are executed sequentially, and functions corresponding to nodes in each part are executed in parallel;
    wherein partitioning the computation graph into sequential parts comprises determining a value for each of at least a first part of the nodes of the computation graph, wherein the value represents a number of edges directed to a given node; and
    wherein each node in the first part has a first predetermined value.

7. The method of claim 1, wherein the first predetermined value is equal to zero.

8. An electronic device, comprising:
    a processor; and
    a memory storing computer program instructions, the processor running the computer program instructions in the memory to control the electronic device to perform acts comprising:
        obtaining an intermediate representation of a machine learning model written in a source language, the intermediate representation being independent of the source language and a target language and comprising a structured text;
        generating a computation graph based on the intermediate representation, nodes in the computation graph representing functions related to the machine learning model, a directed edge in the computation graph representing a dependency between the functions; and
        partitioning the computation graph into sequential parts in sequence, such that the parts are executed sequentially, and functions corresponding to nodes in each part are executed in parallel;
        wherein partitioning the computation graph into sequential parts comprises determining a value for each of at least a first part of the nodes of the computation graph, wherein the value represents a number of edges directed to a given node; and
        wherein each node in the first part has a first predetermined value.

9. The electronic device of claim 8, wherein partitioning the computation graph into sequential parts comprises partitioning the computation graph into the parts based on the values for each of the at least a first part of the nodes.

10. The electronic device of claim 9, wherein partitioning the computation graph into sequential parts based on the values comprises executing iteratively acts of removing, from the computation graph, the first part and a directed edge associated with nodes in the first part, to update the computation graph.

11. The electronic device of claim 10, wherein partitioning the computation graph into sequential parts based on the values comprises executing iteratively acts of selecting one or more sequential first parts of the computation graph, such that each node in the one or more sequential first parts has the first predetermined value.

12. The electronic device of claim 8, wherein the first predetermined value is equal to zero.

13. The electronic device of claim 8, wherein the intermediate representation of the machine learning model is described in a JavaScript Object Notation (JSON) format.

14. The electronic device of claim 8, wherein the intermediate representation of the machine learning model is described in an Extensible Markup Language (XML) format.

15. The computer program product of claim 6, wherein the first predetermined value is equal to zero.

16. The computer program product of claim 6, wherein partitioning the computation graph into sequential parts comprises partitioning the computation graph into the parts based on the values for each of the at least a first part of the nodes.

17. The computer program product of claim 16, wherein partitioning the computation graph into sequential parts based on the values comprises executing iteratively acts of removing, from the computation graph, the first part and a directed edge associated with nodes in the first part, to update the computation graph.

18. The computer program product of claim 17, wherein partitioning the computation graph into sequential parts based on the values comprises executing iteratively acts of selecting one or more sequential first parts of the computation graph, such that each node in the one or more sequential first parts has the first predetermined value.

19. The computer program product of claim 6, wherein the intermediate representation of the machine learning model is described in a JavaScript Object Notation (JSON) format.

20. The computer program product of claim 6, wherein the intermediate representation of the machine learning model is described in an Extensible Markup Language (XML) format.

* * * * *